GALE & AVERY.
Domestic Boiler.
No. 78,588.
Patented June 2, 1868.
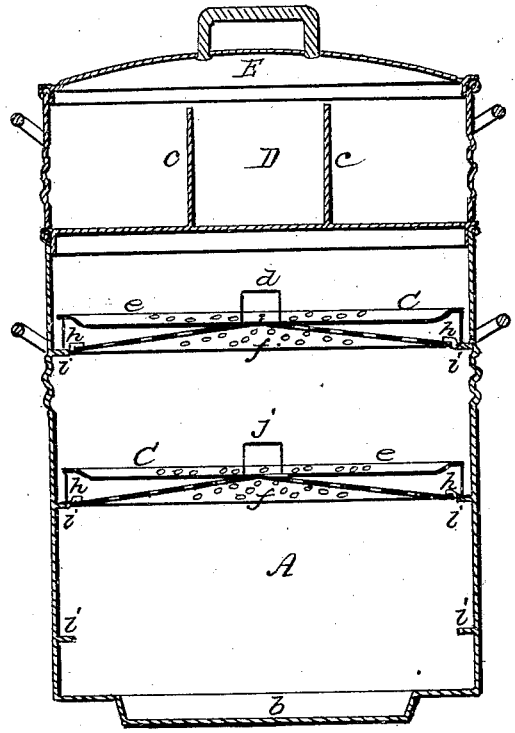
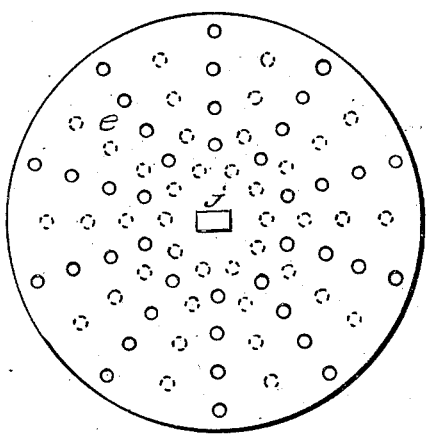
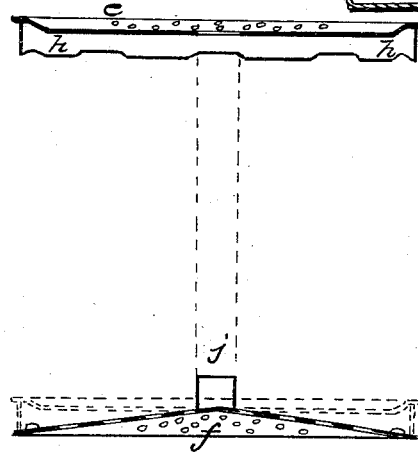

United States Patent Office.

JAMES M. GALE AND IRVING M. AVERY, OF NEW YORK, N. Y.

Letters Patent No. 78,588, dated June 2, 1868.

IMPROVEMENT IN COOKING-APPARATUS.

The Schedule referred to in these Letters Patent and making part of the same.

TO ALL WHOM IT MAY CONCERN:

Be it known that we, JAMES M. GALE and IRVING M. AVERY, both of the city, county, and State of New York, have invented a new and useful Improvement in Steam-Cooking Apparatus; and we do hereby declare the following to be a full, clear, and exact specification thereof, reference being had to the accompanying drawings, in which—

Figure 1 is a vertical section of our apparatus.

Figure 2 is a plan view of one of the removable partitions separately shown.

Figure 3 is a sectional view of the upper and lower plates, which compose said partition, detached from each other.

Like letters indicate corresponding parts in all of the figures.

Our invention has for its object the adapting of a simple vessel of large capacity to the cooking of several kinds of food by steam at the same time, and to prevent the condensed steam and juices from one article dripping upon and imparting flavor to the others; and it consists in the method of constructing the removable partitions, as hereafter described, and in the combination of one or more of said partitions with a steam-cooking vessel or boiler, and also in the combination, with a vessel so constructed and provided, of a section or chamber containing divisions for hot water, tea, and coffee, thereby making the apparatus complete for most of the essential purposes of cooking.

As represented in the drawings, A is a cylindrical cooking-vessel adapted to be used upon a stove or range and provided with a depression or pan, $b$, at its bottom for the reception of water, the steam generated from which is employed for cooking.

The interior of this vessel is provided, at intervals, with lugs, $i\ i$, on which rest the separating partitions or diaphragms C. Above these is provided a section, D, divided by partitions, $c\ c$, into three chambers designed for hot water, tea, and coffee, or other liquids, the top of which is closed by the cover E, which also fits the vessel A, when this section is not in use.

The diaphragms C consist of an upper and lower disk of a size nearly closing the interior of the vessel, the uppermost of which, $e$, is preferably slightly convex on its upper surface, and provided with a downwardly-projecting flange, $h$, which rests on the lower disk $f$.

The latter is of a conical shape, its upper surface inclining from the apex in the centre to the periphery, and is provided with a fixed bail or loop, $j$, which projects through a slot made in the upper plate to receive it, which connects the two loosely together, preventing the rotation of one upon the other, and serves as a handle, by which both are lifted from or placed within the vessel.

Both plates are perforated by a series of holes to allow the steam to pass freely through, and these perforations are so arranged as to prevent the water condensed therefrom, or any juices or liquid from any article which is being cooked, from dripping through the diaphragms upon that which is below it, a result that would mingle the flavors, and so seriously injure the food that it would render it impracticable to cook several kinds at the same time.

To prevent this, the upper plate is punctured from above, so as to allow of the free passage of any liquid through it, and the holes are arranged in lines, which are most conveniently radial from its centre.

The lower plate is pierced in a similar manner, the lines being placed so as to alternate with the position of those of the upper.

These holes are punched from the under side, which has the effect to raise the metal around them, causing the spaces between to be depressed, so that the water or liquid dripping through the holes of the upper plate is readily conducted off to the sides of the vessel, which it follows down to the bottom, avoiding all food that is on the intervening partitions.

Corrugations or grooves in the lower disk will have substantially the same effect.

The plans hitherto employed in cooking with steam, where a series of shallow vessels, sections, or chambers is employed, and the number increased as required, have failed to prove satisfactory because of the limited capacity of each apartment, and the want of a free circulation of steam and consequently heat, so that the number cannot be much increased and a cooking-temperature maintained.

The loss of heat is due, to a great extent, to the joints between these sections, which allow of the escape and condensation of the steam at the sides.

By our arrangement, both these objections are obviated by the readiness and ease with which the partitions can be removed, so that a large article, as a ham or leg of mutton, can be cooked in the vessel A, and one section above it employed; and when the articles are small, the partitions can be increased and a number of kinds of food cooked at the same time without interfering with or spoiling one another, while at the same time the cylinder A, when not required for cooking, is in readiness at all times for the heating of water in quantity, a convenience which every housekeeper will appreciate.

The steam cannot escape or heat be lost, as through joints, in consequence of the sides of the vessel being entire, and consequently there is no deficiency of heat at the uppermost section.

What we claim as our invention, and desire to secure by Letters Patent, is—

1. The construction of the diaphragm C, consisting of the concave and conical disks $c\ f$, alternately perforated, and connected as described, substantially as set forth.

2. The combination of the removable diaphragm or diaphragms C with the cylinder A and lugs $i\ i$, substantially as and for the purposes set forth.

In witness whereof, we have hereunto signed our names in the presence of two subscribing witnesses.

JAMES M. GALE,
IRVING M. AVERY.

Witnesses:
P. S. SANDERSON,
A. V. PRISSON.